US011668338B2

(12) United States Patent
Kim (10) Patent No.: US 11,668,338 B2
(45) Date of Patent: Jun. 6, 2023

(54) BOLT AND NUT LOOSENING PREVENTION ASSEMBLY

(71) Applicant: Duck Gyun Kim, Anseong-si (KR)

(72) Inventor: Duck Gyun Kim, Anseong-si (KR)

( * ) Notice: Subject to any disclaimer, the term of this patent is extended or adjusted under 35 U.S.C. 154(b) by 297 days.

(21) Appl. No.: 17/218,332

(22) Filed: Mar. 31, 2021

(65) Prior Publication Data

US 2021/0310512 A1 Oct. 7, 2021

(30) Foreign Application Priority Data

Apr. 1, 2020 (KR) .......................... 10-2020-0039608

(51) Int. Cl.
*F16B 37/14* (2006.01)
*F16B 39/10* (2006.01)
*F16B 39/24* (2006.01)

(52) U.S. Cl.
CPC ............ *F16B 37/14* (2013.01); *F16B 39/103* (2013.01); *F16B 39/24* (2013.01)

(58) Field of Classification Search
CPC .......... F16B 37/14; F16B 39/08; F16B 39/10; F16B 39/103; F16B 39/24; F16B 39/32; Y10S 411/949
USPC ......... 411/190–192, 197, 204–206, 326, 330
See application file for complete search history.

(56) References Cited

U.S. PATENT DOCUMENTS

| 343,870 | A | * | 6/1886 | Unger | .................... | F16B 39/10 |
| | | | | | | 411/945 |
| 3,294,141 | A | * | 12/1966 | Schotthoefer | ........... | F16C 25/06 |
| | | | | | | 411/976 |
| 5,092,725 | A | * | 3/1992 | Aittama | ................... | F16B 39/32 |
| | | | | | | 411/326 |
| 5,967,721 | A | * | 10/1999 | Giachinta | ............. | F16B 39/282 |
| | | | | | | 411/7 |
| 7,927,052 | B1 | * | 4/2011 | Varden | .................. | F16B 39/108 |
| | | | | | | 411/197 |
| 8,777,278 | B2 | * | 7/2014 | Singh | .................... | F16L 23/036 |
| | | | | | | 285/368 |
| 2007/0151355 | A1 | * | 7/2007 | Marczynski | ............ | B60B 3/165 |
| | | | | | | 73/761 |
| 2017/0356485 | A1 | * | 12/2017 | Ziskovsky | .............. | F16H 57/12 |
| 2019/0234447 | A1 | * | 8/2019 | Chang | ................... | F16B 41/002 |

FOREIGN PATENT DOCUMENTS

| KR | 20-0415224 | 4/2006 |
| KR | 10-2076483 | 2/2020 |

* cited by examiner

*Primary Examiner* — Roberta S Delisle (57) ABSTRACT

The present invention relates to bolt and nut loosening prevention assemblies for preventing a bolt and a nut adapted to fix a first member and a second member to each other from loosening, including: loosening prevention members fitted to the bolt and the nut coupled to the first member and the second member, respectively; caps detachably coupled to the loosening prevention members, respectively, to prevent the loosening prevention members from rotating; and dual washers fixedly coupled to the insides of the loosening prevention members, respectively, to prevent the bolt and the nut from loosening.

6 Claims, 10 Drawing Sheets

BOLT AND NUT LOOSENING PREVENTION ASSEMBLY

CROSS REFERENCE TO RELATED APPLICATION OF THE INVENTION

The present application claims the benefit of Korean Patent Application No. 10-2020-0039608 filed in the Korean Intellectual Property Office on Apr. 1, 2020, the entire contents of which are incorporated herein by reference.

TECHNICAL FIELD

The present invention relates to bolt and nut loosening prevention assemblies, and more particularly, to bolt and nut loosening prevention assemblies that are capable of preventing a bolt and a nut for coupling two members to each other from loosening, thereby allowing the two members to be kept firmly coupled to each other.

BACKGROUND

Bolts and nuts are generally used to couple two members to each other in industrial or construction sites. For example, flanges are provided on the end peripheries of two pipes so as to connect the two pipes to each other, and the adjacent flanges are coupled to each other by means of bolts and nuts.

By the way, if the pipes are used for long hours in a state where they are coupled by means of the bolts and the nuts, the bolts and the nuts become loose by means of a fluid flowing along the pipes or an external force. If the bolts and the nuts become loose, the coupled state of the adjacent pipes becomes also weak, thereby undesirably causing the fluid to leak to the outside.

SUMMARY

Accordingly, the present invention has been made in view of the above-mentioned problems occurring in the related art, and it is an object of the present invention to provide bolt and nut loosening prevention assemblies that are capable of preventing a bolt and a nut for coupling two members to each other from loosening, thereby allowing the two members to be kept firmly coupled to each other.

To accomplish the above-mentioned object, according to the present invention, there are provided bolt and nut loosening prevention assemblies for preventing a bolt and a nut adapted to fix a first member and a second member to each other from loosening, including: loosening prevention members fitted to the bolt and the nut coupled to the first member and the second member, respectively; caps detachably coupled to the loosening prevention members, respectively, to prevent the loosening prevention members from rotating; and dual washers fixedly coupled to the insides of the loosening prevention members, respectively, to prevent the bolt and the nut from loosening, wherein each loosening prevention member includes: a loosening prevention body having a bolt coupling hole formed thereon to fit a bolt shaft of the bolt thereto; a ring wall protruding from an outer periphery thereof to a given thickness in such a manner as to be concentric with the bolt coupling hole; a cap fitting ring formed concentrically between the ring wall and the bolt coupling hole in such a manner as to have a lower height than the ring wall; a cap insertion groove formed between the inner peripheral wall of the ring wall and the cap fitting ring to insert each cap thereinto; an external ratchet formed on an inner peripheral wall of the cap fitting ring; a washer seating surface concaved radially inward from the bottom thereof with a given area on the inner bottom surface of the cap fitting ring; a pair of hook insertion long holes formed on both sides of the cap insertion groove in a circumferential direction in such a manner as to be penetrated into the loosening prevention body by a given length; and hook locking projections formed steppedly concave inward by a given depth from a bottom of the hook insertion long holes.

According to the present invention, desirably, wherein each dual washer includes an upper washer seated onto the washer seating surface and a lower washer coupled unitarily to the upper washer in such a manner as to be located inside the bolt coupling hole, an inner diameter of the upper washer being equal to an outer diameter of the bolt shaft and an outer diameter thereof being equal to a diameter of the washer seating surface, an inner diameter of the lower washer being equal to the outer diameter of the bolt shaft and an outer diameter thereof being equal to a diameter of the bolt coupling hole, and the lower washer protruding by a given thickness from the underside of the loosening prevention body.

According to the present invention, desirably, each cap has an outer diameter equal to an inner diameter of the ring wall, and each cap includes: an internal insertion pipe formed on an interior thereof in such a manner as to be fitted to the inner periphery of the cap fitting ring; an object coupling hole penetrated into a center of the internal insertion pipe to accommodate the bolt or the nut therein; internal teeth formed along an inner peripheral wall of the object coupling hole in such a manner as engage with the bolt or the nut; an internal ratchet formed along an outer peripheral wall of the internal insertion pipe in such a manner as to engage with the external ratchet; and one pair of fixing hooks elastically protruding radially outward from the outer periphery thereof in a facing direction in such a manner as to be inserted into the hook insertion long holes to allow lower end portions thereof to be lockedly coupled to the hook locking projections.

According to the present invention, desirably, the loosening prevention member includes a position fixing projection protruding inward from an outer periphery of the underside of the loosening prevention body in such a manner as to supportedly come into contact with the first member or the second member to allow the loosening prevention body to be fixed in position to the first member or the second member.

According to the present invention, desirably, the loosening prevention body is a circular plate with a size equal to the outer diameter of the ring wall and has one bolt coupling hole formed on the center thereof.

According to the present invention, desirably, the loosening prevention body is a plate having a plurality of bolt coupling holes formed thereon and a plurality of cap fitting rings corresponding to the plurality of bolt coupling holes.

BRIEF DESCRIPTION OF THE DRAWINGS

The above and other objects, features and advantages of the present invention will be apparent from the following detailed description of the embodiments of the invention in conjunction with the accompanying drawings, in which.

DETAILED DESCRIPTION OF THE PREFERRED EMBODIMENTS

To allow the present invention to be more clearly understood, the present invention will be explained with reference to the attached drawings. The present invention may be modified in various ways and may have several exemplary embodiments. Specific exemplary embodiments of the present invention are illustrated in the drawings and described in detail in the detailed description. However, this does not limit the invention within specific embodiments. In the description, the thicknesses of the lines or the sizes of the components shown in the drawing may be magnified for the clarity and convenience of the description.

Figure 1:
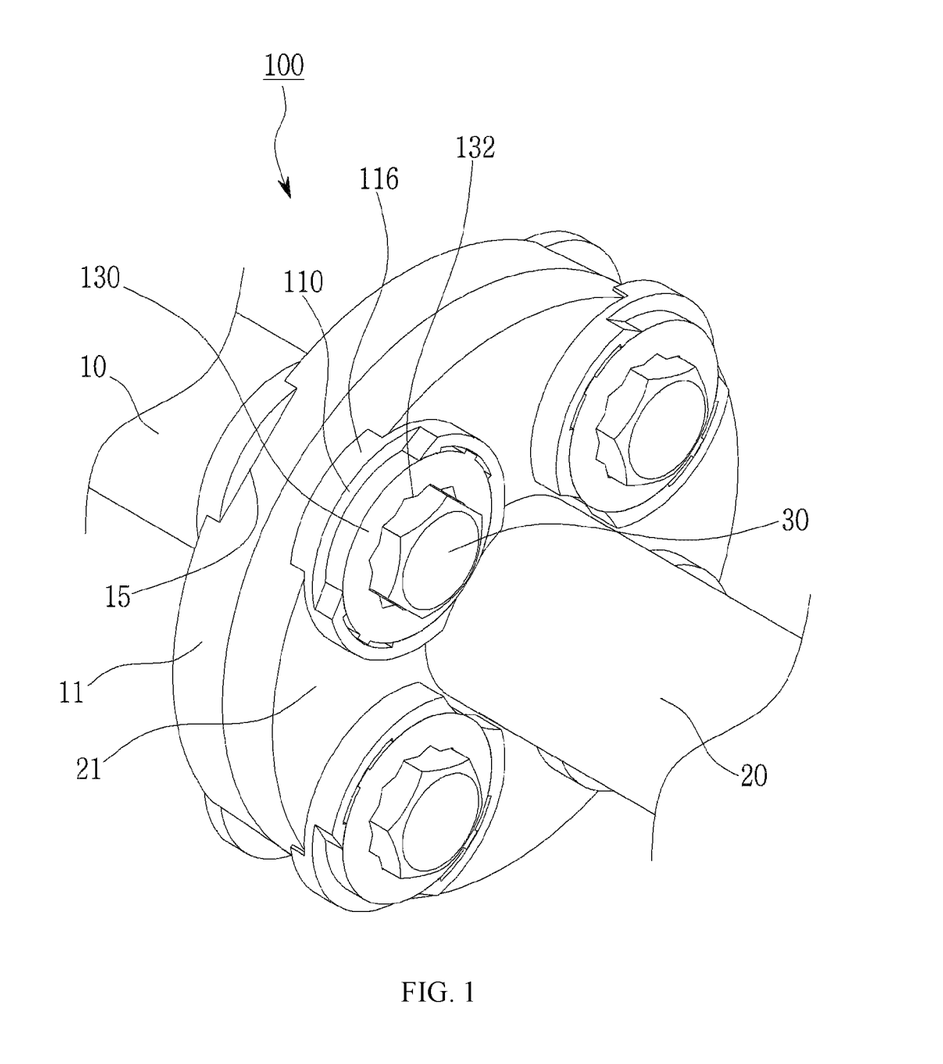
FIG. 1 is a perspective view showing bolt and nut loosening prevention assemblies according to a first embodiment of the present invention, through which a pair of pipes is coupled to each other.
Figures 2A, 2B:
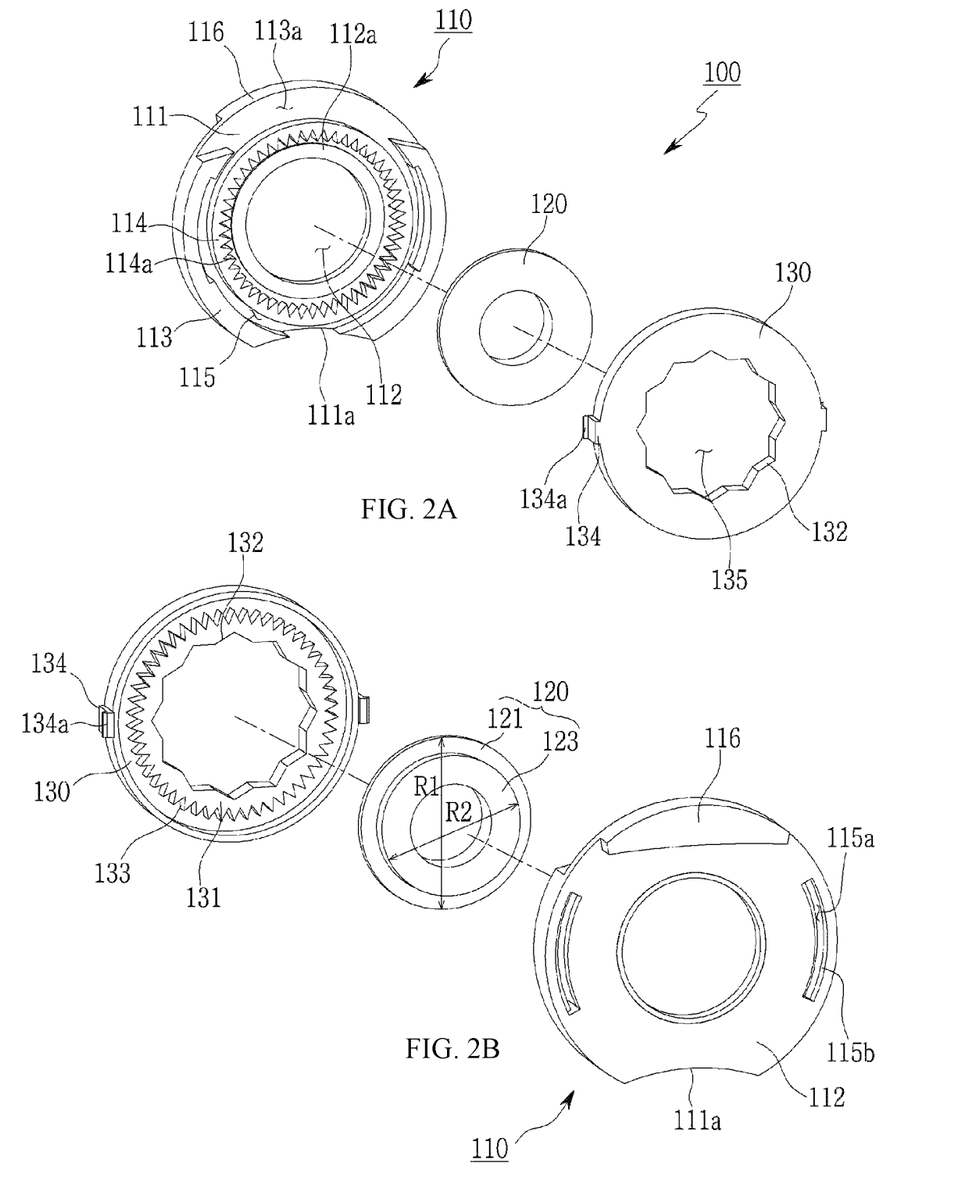
FIGS. 2A and 2B are exploded perspective views showing the bolt and nut loosening prevention assemblies according to the first embodiment of the present invention.
Figure 3:
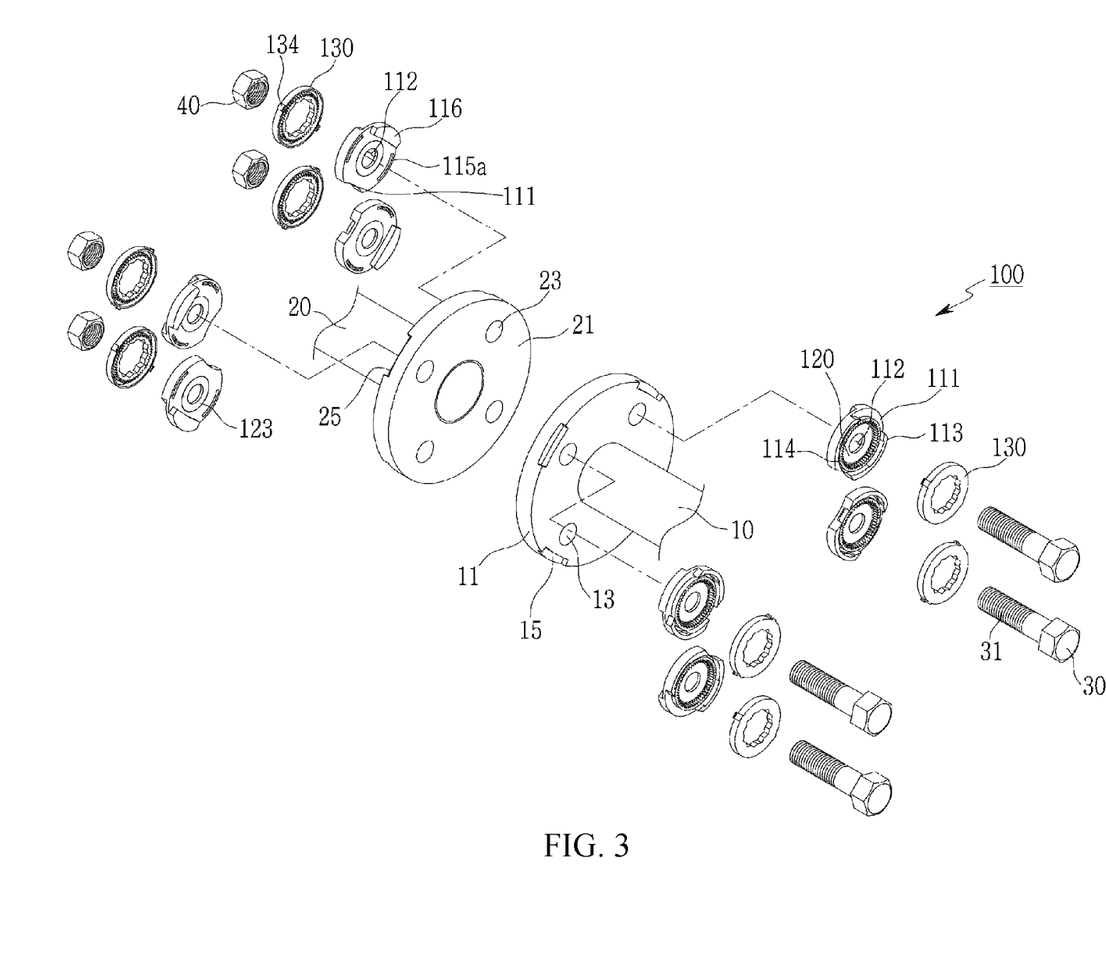
FIG. 3 is a perspective view showing a process in which the bolt and nut loosening prevention assemblies according to the first embodiment of the present invention are coupled to one pair of pipes.

FIG. 1 is a perspective view showing bolt and nut loosening prevention assemblies 100 according to a first embodiment of the present invention, through which a first pipe 10 and a second pipe 20 adjacent to each other are coupled to each other, FIGS. 2A and 2B are exploded perspective views showing the bolt and nut loosening prevention assemblies 100 according to the first embodiment of the present invention, and FIG. 3 is a perspective view showing a process in which the first pipe 10 and the second pipe 20 are coupled to each other by means of the bolt and nut loosening prevention assemblies 100 according to the first embodiment of the present invention.

Before the description, the bolt and nut loosening prevention assemblies 100 according to the first embodiment of the present invention can be applied to both of a bolt and a nut for connecting two members in all of industrial fields. For the convenience of the description, for example, the bolt and nut loosening prevention assemblies 100 according to the first embodiment of the present invention are adapted to prevent a bolt 30 and a nut 40 for coupling the first pipe 10 and the second pipe 20 to each other from loosening, but of course, they may be applied to a bolt and a nut for coupling various members to each other.

The first pipe 10 and the second pipe 20, which are arranged adjacent to each other, have a first pipe flange 11 and a second pipe flange 21 located on both end peripheries thereof. The first pipe flange 11 and the second pipe flange 21 come into close contact with each other and have bolt insertion holes 13 and 23 penetrated thereinto to insert the bolt 30 thereinto. Next, the nut 40 is fastened to a bolt shaft 31 exposed to the outside, thereby finishing coupling of the first pipe 10 and the second pipe 20 to each other.

The bolt and nut loosening prevention assemblies 100 according to the first embodiment of the present invention are coupled to the bolt 30 and the nut 40 fastened to the first pipe flange 11 and the second pipe flange 21, respectively, to prevent the bolt 30 and the nut 40 from loosening, so that the first pipe 10 and the second pipe 20 can be kept firmly coupled to each other.

The bolt and nut loosening prevention assemblies 100 according to the first embodiment of the present invention are coupled to the bolt 30 and the nut 40 located on the surfaces of the first pipe flange 11 and the second pipe flange 21, respectively, to prevent the bolt 30 and the nut 40 from loosening.

Each of the bolt and nut loosening prevention assemblies 100 according to the first embodiment of the present invention includes a loosening prevention member 110 having a bolt coupling hole 112 adapted to insert the bolt shaft 31 thereinto, a dual washer 120 fitted to the inside of the loosening prevention member 110 to prevent the bolt 30 or the nut 40 from loosening, and a cap 130 detachably coupled to the loosening prevention member 110 to allow the loosening prevention member 110 to be fixed in position, without any rotating.

The loosening prevention member 110 includes a disc-shaped loosening prevention body 111 having the bolt coupling hole 112 formed thereon, a ring wall 113 protruding from an outer peripheral surface thereof to a given thickness in such a manner as to be concentric with the bolt coupling hole 112, and a cap fitting ring 114 formed between the ring wall 113 and the bolt coupling hole 112 in such a manner as to be coupled to the cap 130.

The loosening prevention body 111 has the bolt coupling hole 112 formed on a center thereof in such a manner as to be fitted to the bolt shaft 31. The ring wall 113 protrudes to the given thickness from the outer periphery of the loosening prevention body 111. An outer diameter of the ring wall 113 is equal to an outer diameter of the loosening prevention body 111.

The loosening prevention body 111 has a pipe accommodation incised groove 111a concaved radially inward from one side periphery thereof. The pipe accommodation incised groove 111a is incisedly formed to avoid interference with the first pipe 10 or the second pipe 20 when the loosening prevention body 111 is fitted to the bolt shaft 31 on the surface of the first pipe flange 11 or the second pipe flange 21. To do this, the pipe accommodation incised groove 111a is incised to a curvature greater than or equal to a diameter of the first pipe 10 or the second pipe 20.

The ring wall 113 is adapted to support the cap 130 fitted to the cap fitting ring 114 and to thus fix the cap 130 in position. The ring wall 113 has an outer diameter equal to the outer diameter of the loosening prevention body 111 and is provided with an opening 113a formed in an opposite direction to the pipe accommodation incised groove 111a. Through the opening 113a of the ring wall 113, the loosening prevention body 111 is exposed to the outside.

The opening 113a is an area exposed to the outside of the first pipe flange 11 or the second pipe flange 21 when the loosening prevention member 110 is coupled to the first pipe flange 11 of the first pipe 10 or the second pipe flange 21 of the second pipe 20, as shown in FIG. 1. Even if the ring wall 113 is not formed on the area exposed to the outside of the first pipe flange 11 or the second pipe flange 21, the cap 130 can be well fixed in position, and accordingly, the opening 113 is formed for saving a material cost.

Figure 5:
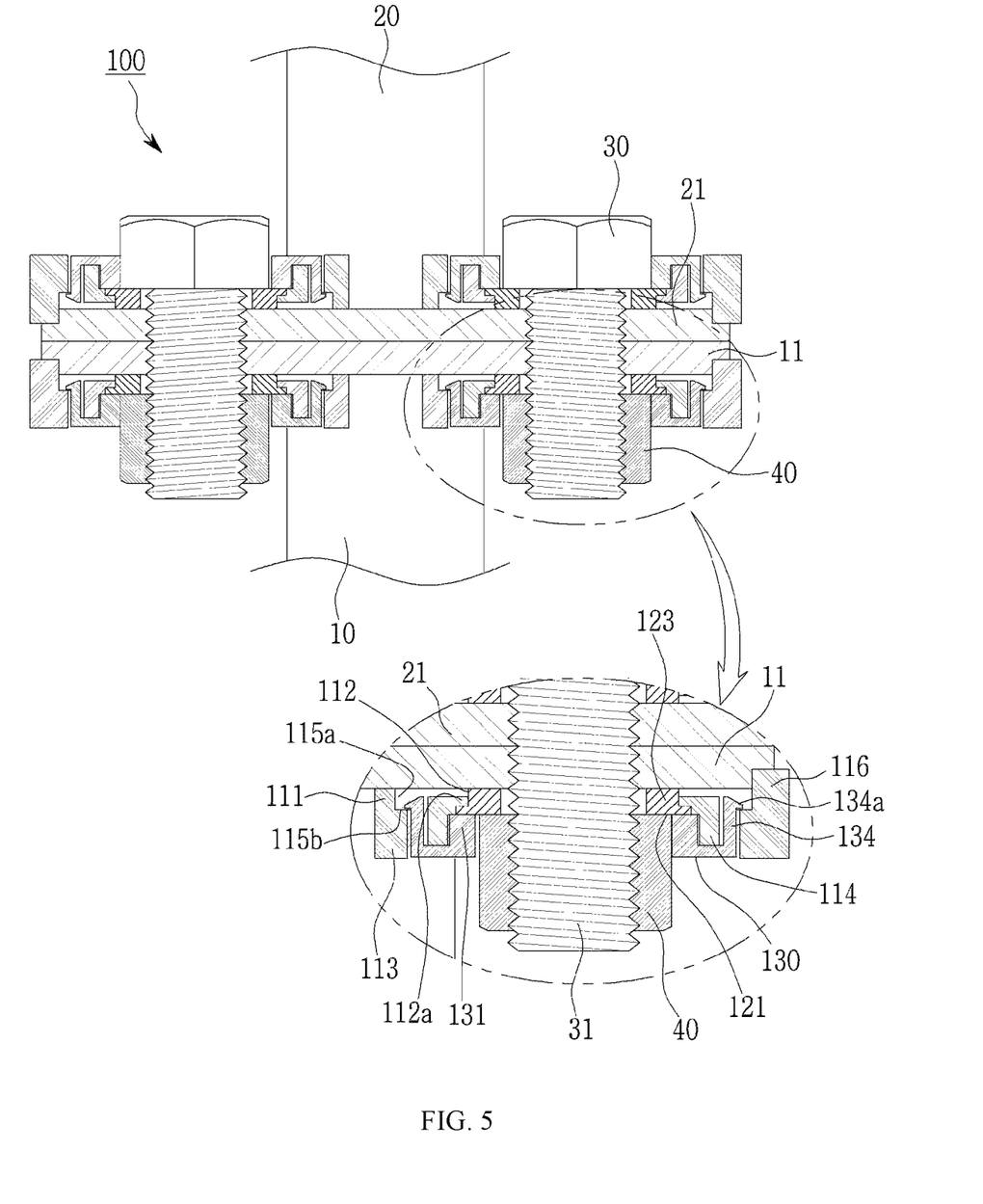
FIG. 5 is a side sectional view showing the pipes to which the bolt and nut loosening prevention assemblies according to the first embodiment of the present invention are coupled.

The cap fitting ring 114 is formed between the ring wall 113 and the bolt coupling hole 112 in such a manner as to protrude to a given height from a bottom of the loosening prevention body 111. The cap fitting ring 114 is formed lower than the ring wall 113, and when the cap 130 is coupled to top of the cap fitting ring 114, as shown in FIG. 5, top of the cap 130 has the same height as the ring wall 113.

A thickness of the cap fitting ring 114 is equal to a distance between an inner wall periphery of the cap 130 and an outer periphery of an inner insertion pipe 131 as will be discussed later, so that the cap 130 is fitted between the ring wall 113 and the cap fitting ring 114.

The bolt coupling hole 112 is penetratedly formed inside the cap fitting ring 114 to insert the bolt shaft 31 thereinto. The cap fitting ring 114 has an external ratchet 114a formed on an inner peripheral wall thereof. The external ratchet 114a has a plurality of teeth densely formed along a circumferential direction thereof. The external ratchet 114a engages with an internal ratchet 133 of the cap 130, as will be discussed later, when the cap 130 is coupled to the loosening prevention member 110, as shown by an enlarged portion of FIG. 4, thereby fixing the loosening prevention member 110 in position. In detail, the external ratchet 114a and the internal ratchet 133 engage with each other so that the loosening prevention member 110 to which the cap 130 is fitted is fixed in position, without rotating.

The cap fitting ring 114 has a washer seating surface 112a concaved radially inward from the bottom thereof with a given area. An upper washer 121 of the dual washer 120, as will be discussed later, is seated onto the washer seating surface 112a.

Further, a cap insertion groove 115, which is formed between the cap fitting ring 114 and the ring wall 113, has a pair of hook insertion long holes 115a penetrated into the loosening prevention body 111 by a given length along a circumferential direction thereof in such a manner as to face each other. Fixing hooks 134 of the cap 130, as will be discussed later, are coupled to one pair of hook insertion long holes 115a.

In this case, as shown in FIGS. 2A and 2B, hook locking projections 115b are formed steppedly by a given depth from a bottom of the cap insertion groove 115 with the hook insertion long holes 115a formed thereon. Hook heads 134a of the fixing hooks 134, as will be discussed later, are lockedly coupled to the hook locking projections 115b to allow the loosening prevention member 110 and the cap 130 to be kept coupled to each other.

Further, as shown in FIG. 2B, a position fixing projection 116 protrudes from the corresponding underside of the loosening prevention body 111 to the opening 113. When the loosening prevention member 110 is coupled to the first pipe flange 11 or the second pipe flange 21, as shown in FIG. 1, the position fixing projection 116 serves as a stopper for fixing the loosening prevention member 110 in position.

The position fixing projection 116 has a given curvature corresponding to the outer diameter of the first pipe 10 or the second pipe 20 so that it is lockedly coupled to a projection coupling groove 15 or 25 formed on the outer peripheral surface of the first pipe flange 11 or the second pipe flange 21, thereby fixing the loosening prevention member 110 in position.

According to the first embodiment of the present invention, the position fixing projection 116 has the given curvature since the loosening prevention assembly 100 is fixed to the circular first pipe flange 11 or the circular second pipe flange 21, but the shape of the position fixing projection 116 may be changed appropriately according to the shapes of the members to which the bolt and the nut are coupled.

The dual washer 120 is fixedly coupled to the washer seating surface 112a formed on the bottom of the cap fitting ring 114. The dual washer 120 is adapted to prevent the bolt 30 or the nut 40 from loosened, thereby improving the coupled state of the bolt or the nut 40. As shown in FIG. 2A, the dual washer 120 is constituted of the upper washer 121 and a lower washer 123 having different outer diameters in such a manner as to be coupled unitarily with each other.

An outer diameter R1 of the upper washer 121 is smaller than an imaginary circle inscribed in the external ratchet 114a, so that the upper washer 121 can be seated onto the washer seating surface 112a. An inner diameter of the upper washer 121 is equal to an outer diameter of the bolt shaft 31 of the bolt 30.

An outer diameter R2 of the lower washer 123 is equal to the bolt coupling hole 114. When the dual washer 120 is fitted to the cap fitting ring 114, as shown in FIG. 5, the lower washer 123 is inserted into the bolt coupling hole 112 in such a manner as to protrude outward by a given length from the bolt coupling hole 112. An inner diameter of the lower washer 123 is equal to the outer diameter of the bolt shaft 31 of the bolt 30, like the inner diameter of the upper washer 121.

A thickness d1 of the upper washer 121 is about 0.5 mm, and a thickness d2 of the lower washer 123 is about 2 mm greater than the thickness d1 of the upper washer 121.

After the dual washer 120 is fitted to the washer seating surface 112a of the cap fitting ring 114, as shown in FIG. 5, the bolt 30 or the nut 40 is inserted into the bolt insertion hole 13 or 23, and when the cap 130 is coupled to the cap fitting ring 114, the underside of the bolt 30 or the nut 40 pressurizes against the upper washer 122, while the bolt shaft 31 is located inside the lower washer 123.

If the bolt 30 is fastened to the nut 40 after the insertion, the upper washer 121 and the lower washer 123 are pressurized against the bolt coupling hole 112 by means of the fastening force between the bolt 30 and the nut 40 to increase a contact area with the bolt 30 or the nut 40, and accordingly, frictional areas of the upper washer 121 and the lower washer 123 are increased to allow their torque to become also strong, so that the upper washer 121 and the lower washer 123 serve to prevent the bolt 30 or the nut 40 from loosening.

According to the first embodiment of the present invention, particularly, the upper washer 121 and the lower washer 123 having the different diameters from each other serve to support against the underside of the bolt 30 or the nut 40 and the bolt shaft 31 to allow their contact area with the bolt 30 or the nut 40 to be substantially increased, so that their frictional area becomes increased to improve their loosening prevention effects.

In this case, the dual washer 120 is constituted of the upper washer 121 and the lower washer 123 coupled unitarily with each other, and of course, the upper washer 121 and the lower washer 123 may be formed independently of each other.

Figure 4:
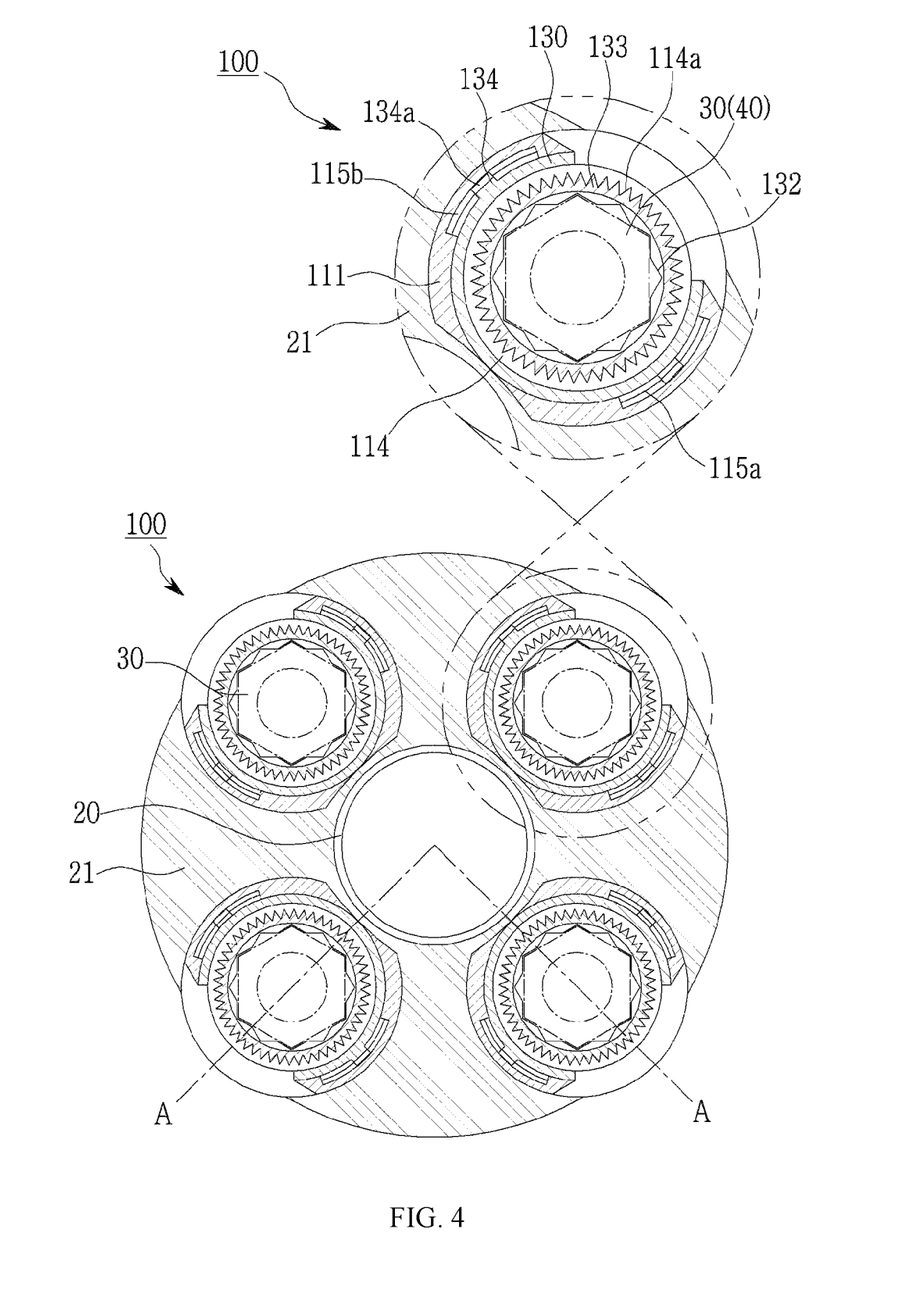
FIG. 4 is a front sectional view showing the pipes to which the bolt and nut loosening prevention assemblies according to the first embodiment of the present invention are coupled.

The cap 130 is detachably coupled to the cap fitting ring 114 to fix the loosening prevention member 110 in position. As shown in FIG. 4, an outer diameter of the cap 130 is equal to an outer diameter of the cap insertion groove 115 and is thus fitted to the cap insertion groove 115.

As shown in FIGS. 2A and 2B, the cap 130 has an internal insertion pipe 131 formed on the underside of the interior thereof. An object coupling hole 135 is penetrated into the center of the internal insertion pipe 131 to accommodate the bolt 30 or the nut 40 therein.

The object coupling hole 135 has internal teeth 132 formed along an inner peripheral wall thereof and an internal ratchet 133 formed along an outer peripheral wall thereof in a circumferential direction.

The internal teeth 132 are repeatedly concave and convex toward the radial outer periphery of the internal insertion pipe 131. The edges of the hexagonal or polygonal bolt 30 or the nut 40 are fitted to the internal teeth 132.

As shown in FIG. 4, the internal ratchet 133 is concave and convex from the outer peripheral wall of the internal insertion pipe 131 in such a manner as to correspond to the external ratchet 114a of the cap fitting ring 114. When the cap 130 is fitted to the cap fitting ring 114, the internal ratchet 133 engages with the external ratchet 114a to prevent the cap 130 from rotating. Accordingly, the nut 40 fitted to the internal teeth 132 of the cap 130 is prevented from rotating, and the bolt 30 to which the nut 40 is coupled is prevented from rotating.

Further, the internal teeth 132 is circumscribed in the bolt 30 or the nut 40, and if the bolt 30 or the nut 40 rotates, accordingly, the outer periphery of the bolt 30 or the edge of the nut 40 is locked onto the internal teeth 132, so that the bolt 30 or the nut 40 is prevented from rotating anymore and is thus fixed in position.

Further, one pair of fixing hooks 134 is provided on the outer periphery of the cap 130 in a facing direction. The fixing hooks 134 have the hook heads 134a protruding from the undersides thereof. When the cap 130 is fitted to the cap fitting ring 114, the fixing hooks 134 are elastically bent inward and then inserted into the hook insertion long holes 115a. As shown in FIG. 5, the hook heads 134a protruding outward from the hook insertion long holes 115a are elastically returned and then locked onto the hook locking projections 115b.

As the hook heads 134a are locked onto the hook locking projections 115b, the fitted state of the cap 130 to the cap fitting ring 114 can be kept firmly.

Now, an explanation on a process of coupling the first pipe 10 and the second pipe 20 through the bolt and nut loosening prevention assemblies 100 with the above-mentioned configuration will be given with reference to FIGS. 1 to 5.

The first pipe flange 11 of the first pipe 10 comes into contact with the second pipe flange 21 of the second pipe 20 by a worker.

The loosening prevention members 110 of the bolt and nut loosening prevention assemblies 100 are located on the bolt insertion holes 13 and 23 formed on the first pipe flange 11 and the second pipe flange 21, respectively. In this case, the bolt coupling holes 112 of the loosening prevention members 110 are located concentrically with the bolt insertion holes 13 and 23.

The bolt shaft 31 of the bolt 30 is inserted into the bolt coupling hole 112 of the loosening prevention member 110 located on the second pipe flange 21 and the second bolt insertion hole 23 formed on the second pipe flange 21 and is then exposed to the outside through the first bolt insertion hole 13 formed on the first pipe flange 11 and the bolt coupling hole 112 of the loosening prevention member 110 located on the first pipe flange 11.

Next, the nut 40 is fitted to the bolt shaft 31 exposed to the outside through the first bolt insertion hole 13 and the loosening prevention member 110. After that, the nut 40 rotates in a fastening direction to the bolt 30.

In the same manner as above, three nuts 40 are fastened to three bolts 30 located on the first pipe flange 11 and the second pipe flange 21.

If the nut 40 is screw-coupled to the bolt shaft 31 by means of the rotation in the fastening direction to the bolt 30, the undersides of the nut 40 and the bolt 30 come into contact with the dual washers 120, and the dual washers 120 are pressurized to apply frictional forces therefrom, so that the nut 40 and the bolt 30 are prevented from loosening, thereby improving the coupled state therebetween.

If the nut 40 is completely fitted to the bolt 30, the caps 130 are coupled to the loosening prevention members 110, respectively. Each cap 130 is inserted into the space between the cap insertion groove 115 and the cap fitting ring 114, and the fixing hooks 134 are fitted to the hook locking projections 115b. Next, the hook heads 134a are locked onto the hook locking projections 115b to finish fixing of the cap 130 to the cap fitting ring 114.

The bolt 30 and the nut 40 are accommodatedly circumscribed in the internal teeth 132 of the object coupling holes 135 of the caps 130, respectively. As the internal ratchet 133 of each cap 130 engages with the external ratchet 114a, the cap 130 is limited in rotation, so that even if an external force is applied to the bolt 30 and the nut 40 after they are completely fastened to each other, they can be stably kept fastened to each other, without loosening.

Particularly, the fixed state of the cap 130 to the cap fitting ring 114 is firmly kept by means of one pair of fixing hooks 134, and accordingly, the coupled state of the bolt 30 and the nut 40 can be kept unless they are separated from each other.

As a result, the bolt 30 and the nut 40 are prevented from loosening for long hours, and also, one pair of pipes 10 and 20 can be kept coupled to each other firmly.

Figure 7:
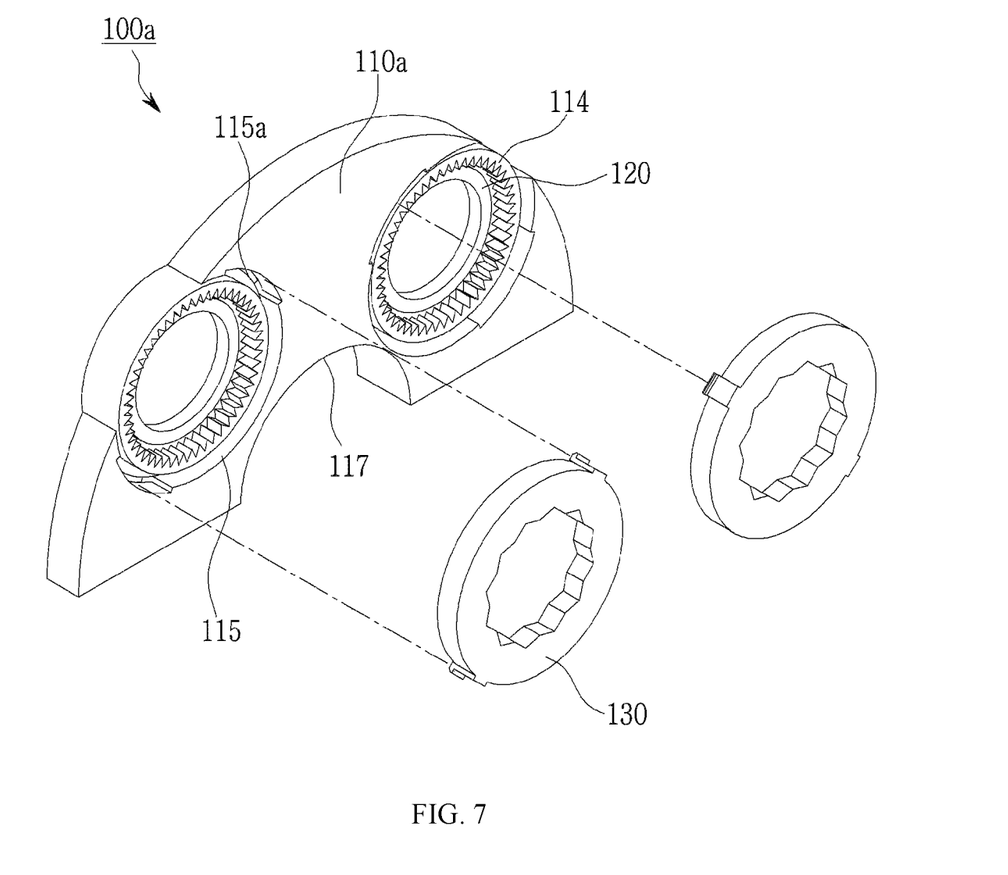
FIGS. 7 and 8 are exploded perspective views showing the bolt and nut loosening prevention assemblies according to the second embodiment of the present invention.
Figure 8:
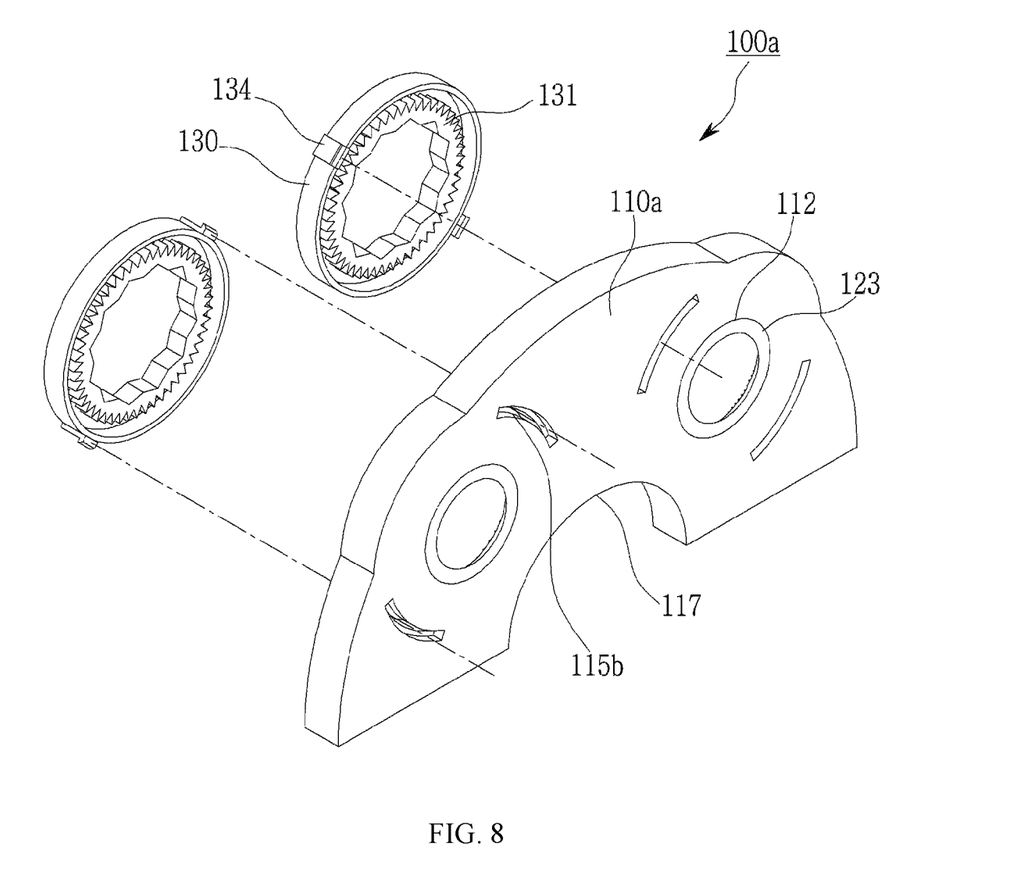

Hereinafter, an explanation on bolt and nut loosening prevention assemblies according to a second embodiment of the present invention will be given with reference to FIGS. 6 to 8. The bolt and nut loosening prevention assemblies 100 according to the first embodiment of the present invention are configured to allow each of the disk-shaped loosening prevention members 110 to have one bolt coupling hole 112 formed thereon, so that the loosening prevention members 110 are coupled to the bolt 30 and the nut 40, respectively. Accordingly, the bolt and nut loosening prevention assemblies 100 can be advantageously coupled to the bolt 30 and the nut 40 for coupling various members, respectively, in a simple manner.

On the other hand, bolt and nut loosening prevention assemblies 100a according to the second embodiment of the present invention are configured to allow each of loosening prevention members 110a to have a given area on which a plurality of bolt coupling holes 112 is formed. For example, each loosening prevention member 110a has a shape of a semicircle corresponding to half of the pipe flange 11 or 21. In some cases, the loosening prevention member 110a may have various shapes such as a square or circular shape according to kinds of members to which the bolt and the nut are coupled.

Each loosening prevention member 110a has the plurality of bolt coupling holes 112, and cap fitting rings 114 are formed around the bolt coupling holes 112, respectively. Next, each of the caps 130 is detachably coupled to a space between the cap fitting ring 114 and the ring wall 113.

Further, each loosening prevention member 110*a* has a pipe insertion hole 117 adapted to fit the pipe 10 or 20 thereto.

If a plurality of bolts 30 and nuts 40 are coupled side by side to each other, the bolt and nut loosening prevention assemblies 100*a* according to the second embodiment of the present invention can couple the bolts 30 and the nuts 40 simultaneously. Even if the bolt and nut loosening prevention assemblies 100*a* are not coupled to the respective bolts 30 and the respective nuts 40, in this case, they can have work time more reduced than the bolt and nut loosening prevention assemblies 100 according to the first embodiment of the present invention.

Figure 9A:
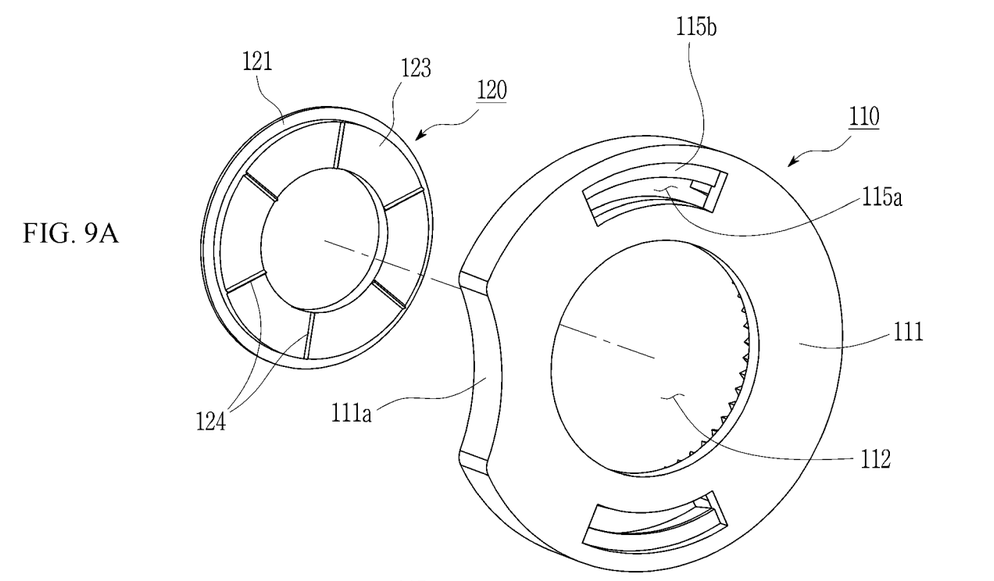
FIGS. 9A and 9B are exploded perspective views showing other examples of a loosening prevention member and a dual washer according to the present invention.
Figure 9B:
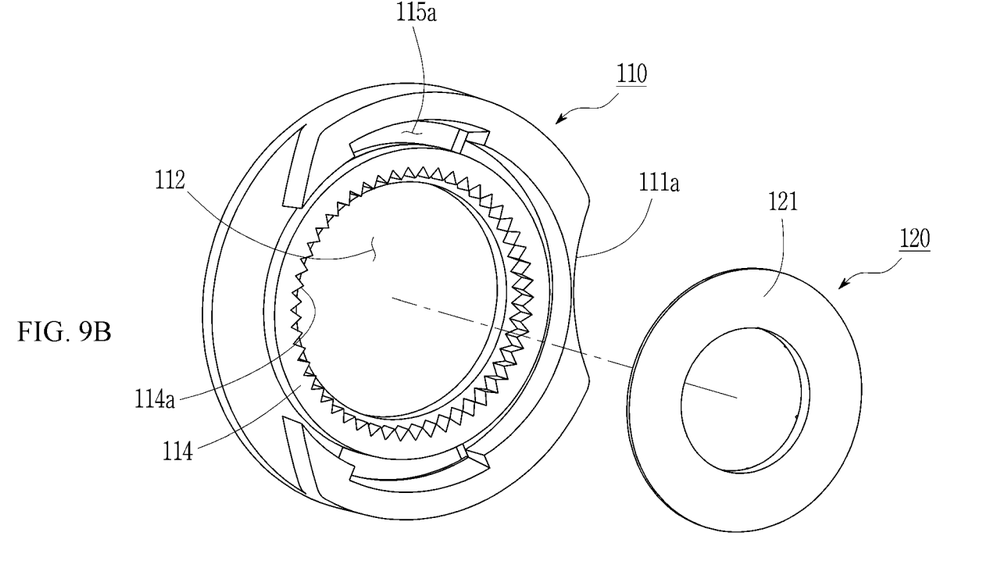
Figure 10:
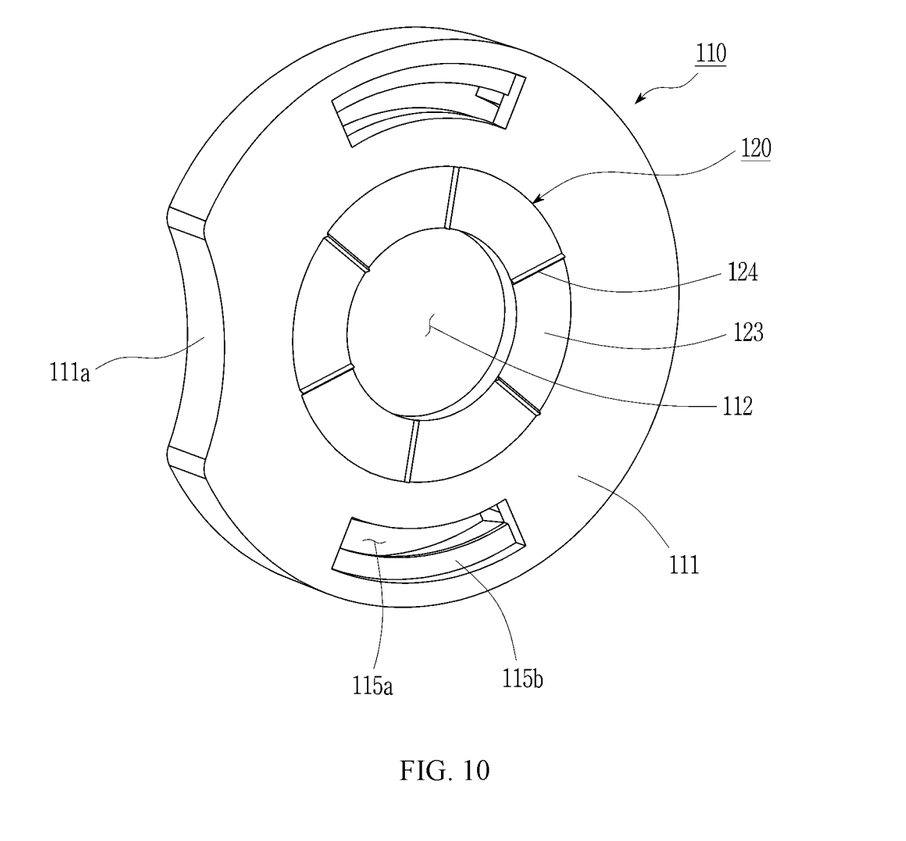
FIG. 10 is a perspective view showing a fastened state of the loosening prevention member and the dual washer of FIGS. 9A and 9B.

On the other hand, the loosening prevention member 110 and the dual washer 120 may be used with other shapes as shown in FIGS. 9A to 10.

As shown in FIGS. 9A and 9B, the loosening prevention member 110 does not have any position fixing projection 116 as shown in FIGS. 1 to 2B. Instead of the position fixing projection 116, the dual washer 120 has a plurality of protrusions 124 protruding from the opposite surface of the lower washer 123 to the upper washer 121 in such a manner as to be spaced apart from each other by a given distance.

If the dual washer 120 is insertedly seated onto the washer seating surface 112*a* of the loosening prevention member 110, as shown in FIG. 10, the plurality of protrusions 124 protrudes outward from the loosening prevention body 111.

Figure 6:
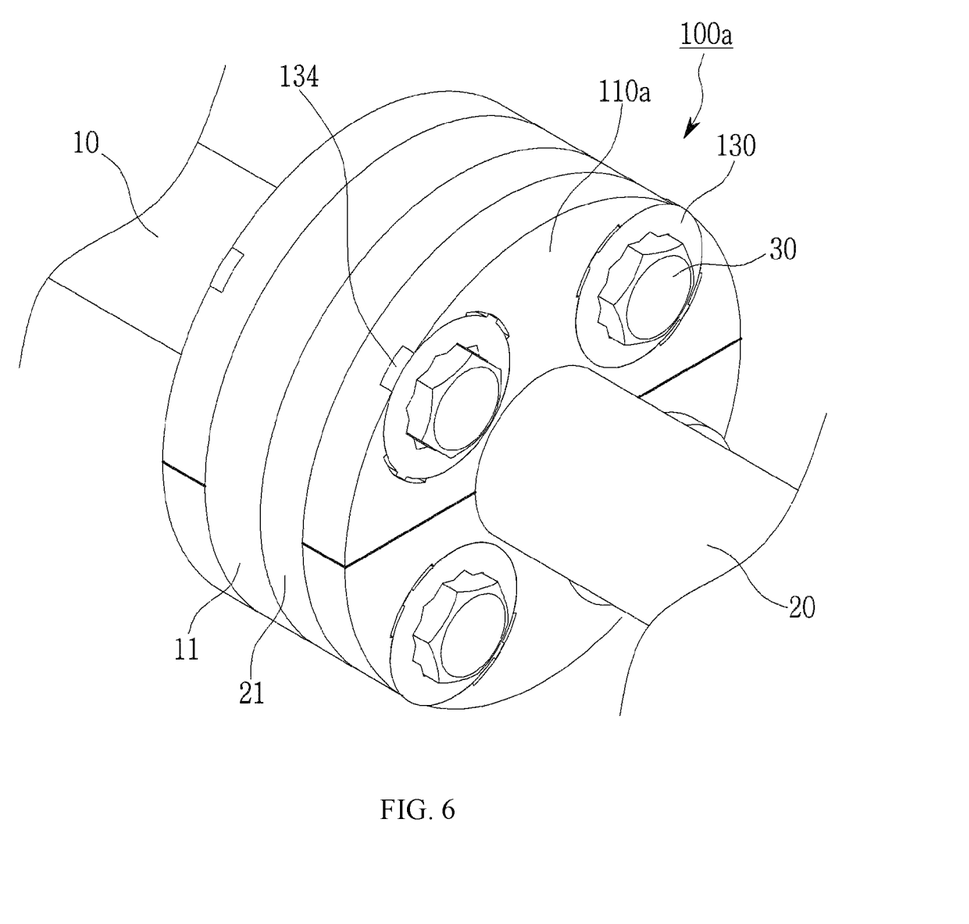
FIG. 6 is a perspective view showing bolt and nut loosening prevention assemblies according to a second embodiment of the present invention, through which a pair of pipes is coupled to each other.

If the first pipe flange 11 and the second pipe flange 21 are fastened to each other by means of the bolts 30 and the nuts 40 fitted to the bolt and nut loosening prevention assemblies 110, as shown in FIG. 1 or 6, the contact surfaces with the plurality of protrusions 124 become physically deformed and damaged by means of the fastening forces applied thereto, and the bolt and nut loosening prevention assemblies 110*a* cannot rotate anymore at their fixed position, so that they can be fixed in position.

As described above, the bolt and nut loosening prevention assemblies according to the embodiments of the present invention are coupled to the bolt and the nut for coupling two members, respectively, to prevent the bolt and the nut from loosening. Accordingly, the two members to which the bolt and the nut are coupled can be stably kept coupled to each other for long hours.

Especially, the bolt and nut loosening prevention assemblies according to the embodiments of the present invention are provided with the dual washers disposed at the insides thereof, each dual washer having different outer diameters, so that the contact areas with the bolt and the nut can be increased to improve the frictional forces against the bolt and the nut, thereby preventing the bolt and the nut from loosening.

Further, the loosening prevention member to which the bolt shaft is fitted and the cap in which the bolt head or nut is accommodated engage with each other by means of the ratchets, so that they can be fixed in position, without rotating. Accordingly, loosening of the bolt or the nut can be prevented unless the cap is separated from the loosening prevention member manually by the worker.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. Bolt and nut loosening prevention assemblies for preventing a bolt and a nut adapted to fix a first member and a second member to each other from loosening, comprising:
    loosening prevention members (110) fitted to the bolt and the nut coupled to the first member and the second member, respectively;
    caps (130) detachably coupled to the loosening prevention members (110), respectively, to prevent the loosening prevention members (110) from rotating; and
    dual washers (120) fixedly coupled to the insides of the loosening prevention members (110), respectively, to prevent the bolt and the nut from loosening,
    wherein each loosening prevention member (110) comprises:
    a loosening prevention body (111) having a bolt coupling hole (112) formed thereon to fit a bolt shaft (31) of the bolt thereto;
    a ring wall (113) protruding to a given thickness from an outer periphery thereof in such a manner as to be concentric with the bolt coupling hole (112);
    a cap fitting ring (114) formed concentrically between the ring wall (113) and the bolt coupling hole (112) in such a manner as to have a lower height than the ring wall (113);
    a cap insertion groove (115) formed between the inner peripheral wall of the ring wall (113) and the cap fitting ring (114) to insert each cap (130) thereinto;
    an external ratchet (114*a*) formed on an inner peripheral wall of the cap fitting ring (114);
    a washer seating surface (112*a*) concaved radially inward from the bottom thereof with a given area on the inner bottom surface of the cap fitting ring (114);
    a pair of hook insertion long holes (115*a*) formed on both sides of the cap insertion groove (115) in a circumferential direction in such a manner as to be penetrated into the loosening prevention body (111) by a given length; and
    hook locking projections (115*b*) formed steppedly concave inward by a given depth from a bottom of the hook insertion long holes (115*a*).

2. The loosening prevention assemblies according to claim 1, wherein each dual washer (120) comprises an upper washer (121) seated onto the washer seating surface (112*a*) and a lower washer (123) coupled unitarily to the upper washer (121) in such a manner as to be located inside the bolt coupling hole (112), an inner diameter of the upper washer (121) being equal to an outer diameter of the bolt shaft (31) and an outer diameter thereof being equal to a diameter of the washer seating surface (112*a*), an inner diameter of the lower washer (123) being equal to the outer diameter of the bolt shaft (31) and an outer diameter thereof being equal to a diameter of the bolt coupling hole (112), and the lower washer (123) protruding by a given thickness from the underside of the loosening prevention body (111).

3. The loosening prevention assemblies according to claim 2, wherein each cap (130) has an outer diameter equal to an inner diameter of the ring wall (113), and each cap (130) comprises:
    an internal insertion pipe (131) formed on an interior thereof in such a manner as to be fitted to the inner periphery of the cap fitting ring (114);
    an object coupling hole (135) penetrated into a center of the internal insertion pipe (131) to accommodate the bolt or the nut therein;

internal teeth (132) formed along an inner peripheral wall of the object coupling hole (135) in such a manner as engage with the bolt or the nut;

an internal ratchet (133) formed along an outer peripheral wall of the internal insertion pipe (131) in such a manner as to engage with the external ratchet (114*a*); and one pair of fixing hooks (134) elastically protruding radially outward from the outer periphery thereof in a facing direction in such a manner as to be inserted into the hook insertion long holes (115*a*) to allow lower end portions thereof to be lockedly coupled to the hook locking projections (115*b*).

4. The loosening prevention assemblies according to claim 1, wherein each loosening prevention member (110) comprises a position fixing projection (116) protruding inward from an outer periphery of the underside of the loosening prevention body (111) in such a manner as to supportedly come into contact with the first member or the second member to allow the loosening prevention body (111) to be fixed in position to the first member or the second member.

5. The loosening prevention assemblies according to claim 4, wherein the loosening prevention body (111) is a circular plate with a size equal to the outer diameter of the ring wall (113) and has one bolt coupling hole (112) formed on the center thereof.

6. The loosening prevention assemblies according to claim 4, wherein the loosening prevention body (111) is a plate having a plurality of bolt coupling holes (112) formed thereon and a plurality of cap fitting rings (114) corresponding to the plurality of bolt coupling holes (112).

\* \* \* \* \*